United States Patent
Barnes et al.

(10) Patent No.: US 6,684,080 B1
(45) Date of Patent: Jan. 27, 2004

(54) TRUNKED RADIO REPEATER COMMUNICATION SYSTEM INCLUDING HOME CHANNEL ALIASING AND CALL GROUPING

(75) Inventors: Keith W. Barnes, Waseca, MN (US); Rory A. Smith, Waseca, MN (US); Mervin L. Grindahl, Waseca, MN (US)

(73) Assignee: Transcrypt International/E. F. Johnson Company, Burnsville, MN (US)

( * ) Notice: Subject to any disclaimer, the term of this patent is extended or adjusted under 35 U.S.C. 154(b) by 700 days.

(21) Appl. No.: 09/058,687

(22) Filed: Apr. 10, 1998

Related U.S. Application Data (60) Provisional application No. 60/047,843, filed on May 28, 1997.

(51) Int. Cl.[7] .................................................. H04B 7/00
(52) U.S. Cl. ........................ 455/515; 455/519; 455/509
(58) Field of Search ................................. 455/515, 516, 455/517, 518, 519, 520, 526, 509–514

(56) References Cited

U.S. PATENT DOCUMENTS 5,203,015 A * 4/1993 George ........................ 455/514
5,613,201 A * 3/1997 Alford et al. ........... 455/520 X

* cited by examiner

Primary Examiner—Nay Maung
Assistant Examiner—Philip J. Sobutka
(74) Attorney, Agent, or Firm—Schwegman, Lundberg, Woesner & Kluth, P.A.

(57) ABSTRACT

A system for channel assignment in a trunked transmission communication system including a plurality of subscribers. A plurality of subscribers is provided home channel assignment to reduce collisions. A home channel alias is provided for home channel coverage where a designated home channel is unavailable. A system for call grouping is provided to avoid talk group splitting. A first check is used to determine if other channels are conducting communications with identical home and talk group information. A second check is available after a temporary channel assignment. In one system both the home channel aliasing and call grouping are performed.

24 Claims, 4 Drawing Sheets

TRUNKED RADIO REPEATER COMMUNICATION SYSTEM INCLUDING HOME CHANNEL ALIASING AND CALL GROUPING

CLAIM OF BENEFIT UNDER 35 U.S.C. 119(e)

This patent application claims the benefit of earlier filed provisional patent application U.S. Ser. No. 60/047,843, filed May 28, 1997, according to 35 U.S.C. 119(e).

FIELD OF THE INVENTION

The present invention relates generally to trunked radio communications systems, and in particular to a method and apparatus for trunked communication systems including home channel aliasing and call grouping.

BACKGROUND OF THE INVENTION

Mobile radio communication systems provide for two way radio communications between a central control station and a fleet of cars, trucks, or other vehicles. Typical users of mobile radio communication systems include, for example, police departments, fire departments, taxi services and delivery services. Present mobile radio communication systems can be configured to provide for radio communications between the control station and all vehicles in a fleet, between the control station and selected vehicles in the fleet, or between different individual vehicles or groups of vehicles within a fleet.

Conventional mobile radio communication systems are typically organized with a number of vehicles and a control station assigned to a single common channel for a given coverage zone. A user assigned to the common channel must wait until no one else is transmitting on that channel before sending a message, because only one transmission at a time can be processed by a single channel. Even when a transmission is addressed to only one user in a conventional system (and therefore not heard by other users), the other users in the system must wait until that transmission is completed before they can use the system to communicate.

Mobile radio communication systems using transmission trunking are an improvement over conventional mobile radio communication systems in that trunked systems enable two or more users to communicate on the system at the same time. For instance, the dispatch console in a transmission trunked communication system can be communicating with one of the vehicles in the fleet; while, at the same time, two other vehicles in the fleet can be using the same trunked system to communicate with each other. Transmission trunked communication systems group a number of channels for the same coverage zone together into a single audio communication system, with each channel accessible to each user in the system. Because each user will only need to communicate over the trunked system part of the time, and because it is unlikely that all users will need to communicate at precisely the same time, the number of channels assigned to a trunked system group can always be less than the number of users allocated to that trunked system group.

The United States Federal Communications Commission (FCC) has assigned 600 channels in the 800 MHZ band for trunked land mobile use. Each channel is comprised of a pair of assigned frequencies, a mobile transmit frequency and a repeater transmit frequencies. Mobile transmit frequencies are 806–821 MHZ, with the repeater transmit frequencies exactly 45 MHZ above the corresponding mobile transmit frequency, or 851–866 MHZ. Channel spacing is 25 KHz, with the maximum allowed deviation between channels being ±5 KHz. In September 1987, the FCC also allocated 399 channels in the 900 MHZ band for trunked land mobile use. Mobile transmit frequencies are 896–901 MHZ, with the repeater transmit frequencies exactly 39 MHZ above the corresponding mobile transmit frequency, or 935–940 MHZ. Channel spacing is 12.5 KHz, with the maximum allowed deviation between channels being ±2.5 KHz.

In transmission trunked communication systems, a signaling protocol is used to send and receive control signals among users on each channel in the trunked system and a switching protocol is used to establish which channels those users will be communicating over. The preferred conventional transmission trunked communication system uses a signaling protocol that transmits the control signals in the subaudio band simultaneously with the transmission of voice or data information signals. Signaling protocols that can communicate control signals within the constraints of the subaudio band are preferred, because use of the subaudio band precludes the need for using a dedicated channel for transmitting the control signals (thereby reducing the number of available channels in the trunked system for voice and data communications). A switching protocol is used by the trunked system to automatically find and engage an open channel when a user initiates a transmission. To maximize the trunking capabilities of such a system, the switching protocol must efficiently allocate channels in the trunked system and avoid channels that are already in use at the time the transmission is initiated. For further explanation of a conventional transmission trunked communication system, reference is made to the description of the operation of the ClearChannel LTR® system contained in the manual entitled "E. F. Johnson ClearChannel LTR Application Note", Part No. 009-0001-020 (Rev. 5, October 1988), available from E. F. Johnson Company, Waseca, Minn., which is fully incorporated by reference herein. New transmission trunked communications systems have also been proposed which incorporate advances in network communications. For example, the E. F. Johnson MULTINET(tm) system, part of which is described in U.S. Pat. No. 5,159,701 to Barnes, et al., which is incorporated by reference in its entirety. U.S. Pat. No. 5,159,701 provides for, among other things, distributively interconnecting a plurality of land mobile trunked transmission communication systems into a wide area network.

There is a need in the art for a trunked radio communication system which supports large volumes of traffic and which provides efficient and reliable channel allocation.

SUMMARY OF THE INVENTION

A channel assignment system for a trunked radio communication system is provided to facilitate communications for a plurality of subscribers in the trunked radio communication system.

Trunked systems require the sharing of a relatively small number of channels with respect to the number of subscribers the system may support. The large volume of traffic results in collisions between subscribers attempting to use the same channels. This is particularly problematic where the system employs a "home channel" concept. A home channel is a system by which subscribers are assigned a particular channel upon which communications relating to that subscriber are initially conducted. One problem with the home channel concept is that a large volume of traffic can result in long delays between a subscriber's request for a channel and receipt of a channel to conduct communications.

Additionally, a large volume of traffic can also result in a splitting of talk groups. A talk group is a collection of subscribers who receive like instructions for channels to use for reception and transmission in order to maintain consistency in communications for all subscribers in the talk group. For example, splitting of a talk group may occur if two or more subscribers of a same talk group request a channel at approximately the same time and some of the subscribers from the same talk group may be directed to conduct communications on different channels.

These and other issues are addressed by the various embodiments provided for by the present system. In one embodiment, the home, channels of the present system are distributed to avoid excessive use of a single channel. In one embodiment, a home channel assignment system is provided to assign home channels to a subscriber in a trunked radio communication system. Home channel assignment is provided for the cases where the subscriber enters a locality including the preassigned home channel to the subscriber and where the locality does not include the preassigned home channel to the subscriber. In one embodiment, the home channel is assigned to the next lower available home channel if the preassigned home channel is not active in a particular locality. In one embodiment, the home channel is assigned to the next higher available home channel if the preassigned home channel is not active in a particular locality.

In one embodiment, a call grouping system is provided to avoid talk group splitting. Upon a channel request by a subscriber having its own home channel and talk group, a repeater checks other channels in a system to ensure that communications for a given home channel and talk group are not being conducted on another channel. In one embodiment a single check is performed for other channels conducting communications having the identical home channel and talk group. In another embodiment, a double check is available for other channels conducting communications having the identical home channel and talk group.

In one embodiment, both home channel aliasing and the call grouping are performed.

Other embodiments are provided in the detailed description, below, and the scope of the invention is to be determined by the scope of the appended claims and their equivalents.

DETAILED DESCRIPTION

In the following detailed description of the preferred embodiment, references are made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. The following detailed description is, therefore, not to be taken in a limiting sense, and the scope of the present invention is defined by the appended claims and equivalents thereof.

The complete specifications of the following patents and patent applications are incorporated by reference in their entirety:

U.S. Pat. No. 5,159,701, entitled: METHOD AND APPARATUS FOR A DISTRIBUTIVE WIDE AREA NETWORK FOR A LAND MOBILE TRANSMISSION TRUNKED COMMUNICATION SYSTEM, issued Oct. 27, 1992;

U.S. Pat. No. 5,040,237, entitled: RADIO TRUNKING FAULT DETECTION SYSTEM, issued Feb. 20, 1990;

U.S. patent applications Ser. Nos. 08/400,854, filed Mar. 8, 1995 and 08/693,557, filed Aug. 7, 1996, both entitled: PRIORITY SYSTEM FOR A WIDE AREA TRANSMISSION TRUNKED COMMUNICATION SYSTEM;

U.S. Provisional Patent Application Ser. No. 60/047,843, filed May 28, 1997, entitled IMPROVED REPEATER COMMUNICATIONS PROTOCOL; and U.S. patent application Ser. No. 09/058,678, filed Apr. 10, 1998, entitled: TRUNKED RADIO REPEATER COMMUNICATIONS SYSTEM, A trunked radio system, as defined by the FCC, is a "method of operation in which a number of radio frequency pairs are assigned to radios and base stations in the system for use as a trunk group". Trunking is the pooling of radio channels where all users have automatic access to all channels reducing waiting time and increasing channel capacity for a given quality of service.

Trunking concepts are based on the theory that individual subscribers use the system a small percentage of the time and that a large number of subscribers will not try to use the system at the exact same time.

In the present system, communications are conducted by subscribers communicating with repeaters. For the purposes of this description, a subscriber shall include, but not be limited to, a portable radio, a mobile radio, and a handheld radio. Repeaters in the present system conduct communications which are compatible with an LTR repeater in which a logic module performs the call functions and communicates over the air to the subscriber(s). Each repeater provides a radio frequency (hereinafter "RF") channel and each repeater contains a logic module responsible for signaling on its own channel. Logic modules then share information with all other repeaters in the system via inter-repeater communications. System control is accomplished by the exchange of data messages between subscriber and repeater. In one embodiment, the system trunks up to 20 channels by utilizing continuous subaudible digital data applied to the RF carrier simultaneously with voice modulation. Therefore, no dedicated control channel is required and all channels are used for voice communications for system efficiency. Each radio is assigned a home channel which will send system commands to specified radios.

The present system may be used in a "locality". A locality includes a set of repeaters interconnected together to pool the channels in a trunked channel group at a physical site or location. In one embodiment of the present system, each locality has a Status channel. The Status channel is used to convey traffic on the system for repeater backup purposes. The Status channel additionally transmits continuously for subscriber units that are roaming. The Status channel may also be used for voice communications at any time.

Since each repeater is responsible for signaling on its own channel, this approach lends itself well to a distributed processing logic controlled approach requiring only a small logic unit within each repeater. These processors share information over a communication path. This architecture permits each repeater to be autonomous. A failure in one repeater leaves the remainder of the system intact and running.

In one embodiment, the repeaters are connected to a larger system infrastructure. This allows the system to perform some of the aforementioned calls. The system is capable of communicating from one infrastructure set to another. In such an embodiment, the system infrastructure may be centrally located or distributed at each site or "locality".

Figure 1:
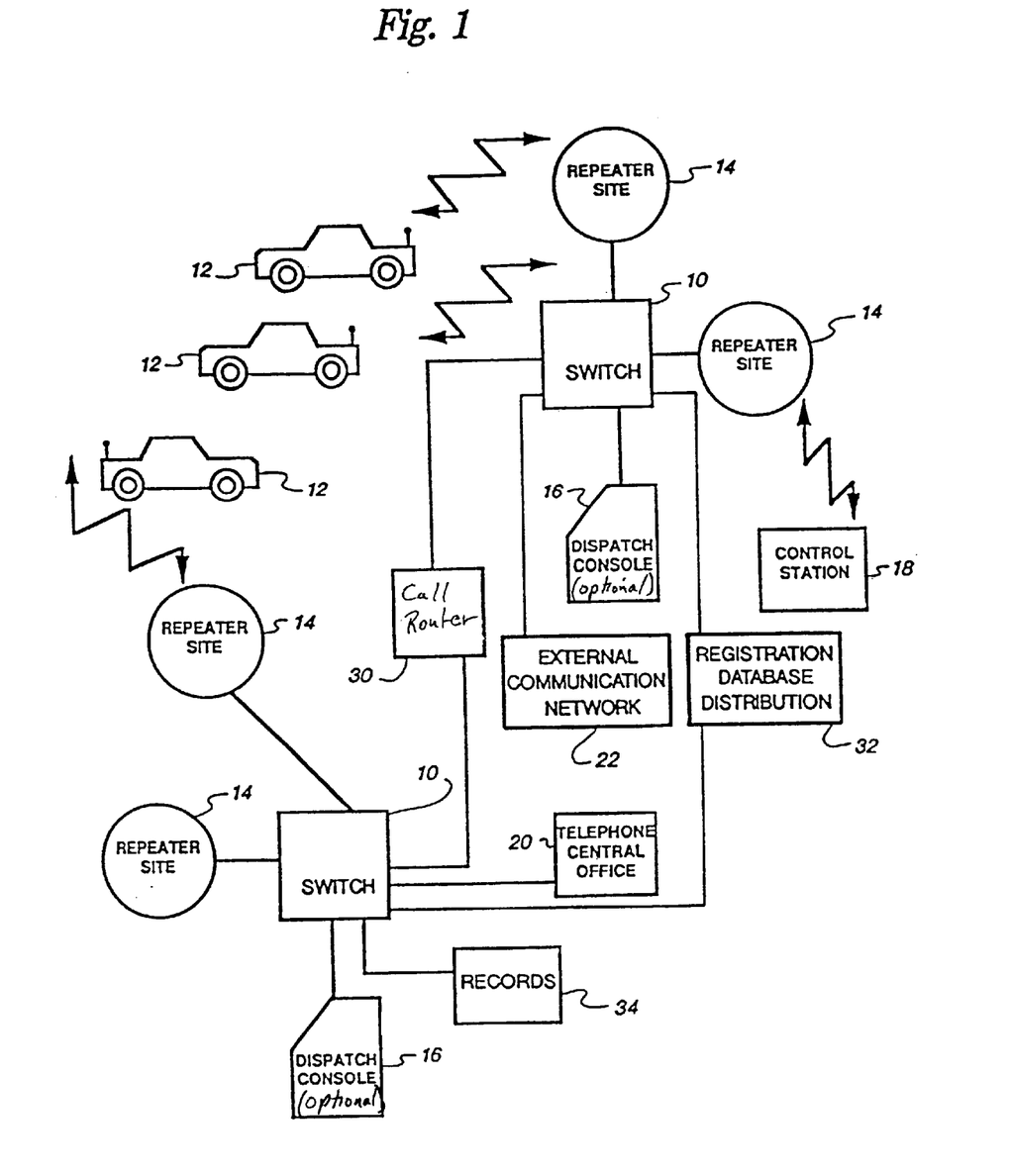
FIG. 1 is a block diagram of a trunked radio communication system, according to one embodiment of the present system.

FIG. 1 is a block diagram of a land mobile trunked radio communication system using switches 10 and repeaters 14, according to one embodiment of the present system. The switches 10 utilize a unique signaling protocol and a switching protocol adapted for communication of control signals in the subaudio band. A call router 30 interconnects subsystems, each of which includes, but is not limited to, a switch 10, a plurality of subscribers 12 for transmitting and receiving transmission trunked radio communications over one or more channels, and a plurality of repeaters 14. In one embodiment, the transmission trunked radio communications comprise an information signal and a control signal using transmission trunking, with the control signals transmitted simultaneously in the subaudio range on the same channel over which the information signals are transmitted. Switch 10 is used for selectively interconnecting two or more of the repeaters 14 in each trunked subsystem, as well as providing the link between other trunked systems in a wide area network.

In one embodiment, switch 10 is connected to a dispatch console 16 for monitoring the users of subscribers 12 and dispatching calls and other communications. Alternatively, a remotely located control station 18 is used to perform the dispatching function on the system. The control station 18 may include a selective call console and communications with the repeater 14 by way of radio communication to the link of the switch 10, rather than via a direct or hard-wired connection with the switch 10. In addition, switch 10 may be connected with the telephone central office 20 or an external communication network 22 (e.g. a satellite communication system or a private PBX system) to allow users on the system to make and receive communications or calls outside of the network.

In one embodiment, two or more switches 10 are interconnected by a call router 30 that operates as a high speed voice grade communication path between the switches 10. The call router 30 may be any type of matrix switching equipment or PABX that is capable of handling directed voice switching. Switch 10 may also be interconnected to a registration database 32 for maintaining a database of registration information that can be communicated among the switches 10 as a subscriber 12 moves from coverage zone to coverage zone. Additionally, one or more of the switches 10 may be connected to a record monitor 34 for monitoring activity on the network and performing record keeping, billing and other accounting information functions. The activities of the call router 30, the registration database 32 and the record monitor 34 may be contained within a single computer linked to each of the switches 10, or may be distributed among several processors linked to one or more of the switches 10, depending upon the type of configuration and the functions that are required of a particular user's network.

The operation of an independent transmission trunked communication system associated with each switch 10 for one embodiment of the present system will now be described. Control signaling between the repeaters 14 associated with a switch 10 and the subscriber 12 is done with subaudio control signals on each channel designated as a "home channel". Each subscriber 12 in the trunked system is assigned to a home channel that it monitors when the subscriber 12 is not involved in a call. Subscriber 12 receives control signal instructions over the home channel to either stay on the home channel and open its audio to receive a call, or to change to a different channel and open its audio to receive a call. If the subscriber 12 is sent to another channel to receive a call, it will return to its home channel as soon as the call is completed.

When a subscriber 12 wants to initiate a call, all the operator has to do is depress the push-to-talk (PTT) button and hold it. If the home channel assigned to subscriber 12 is available, the transmitter for subscriber 12 will transmit a control signal on the home channel frequency telling the repeater 14 that a call is being setup on that channel. At that point, the subscriber 12 turns its transmitter off and waits for a return message from the repeater 14. If the repeater 14 is not busy, the repeater 14 will broadcast a handshake message that will be received by all subscribers 12 assigned to the same home channel. The operator of the initiating subscriber 12 will hear an audible proceed tone and its transmitter will be enabled to proceed with the call. For this type of group calling, all other subscribers 12 with the correct group identification will remain on the channel and open their squelch to receive the call. All subscribers 12 that did not have the proper group identification would remain muted, but the logic unit of these subscribers 12 would receive and store the control signal indicating that their home channel was now busy and that they would get a free channel assignment. As a result, if a subscriber 12 not involved in the call described above now wanted to initiate a call, it would know where a free channel was so that it would not have to look for a free channel in the trunked system.

If the home channel for a subscriber 12 was busy when a call was initiated, the initial data transmission would be made on the free channel that it had stored in memory. The repeater 14 receiving the call would notify the repeater 14 for the home channel assigned to the subscriber 12 initiating the call that a call was being setup on the free channel for a group assigned to the home channel repeater 14. The home channel repeater 14 would then add this information to the control signal being sent out over the home channel, and would also change the free channel assignment to another free channel. The subscriber 12 that had a proper group assignment would receive the control signal sent out over the home channel that a call was being setup for their group on the directed channel and would switch to that channel and open their squelch to receive the call. All other groups 12 that did not have the proper group assignment would store the free channel information and would continue to monitor the home channel.

Channel Distribution of Subscriber Units

Figure 2:
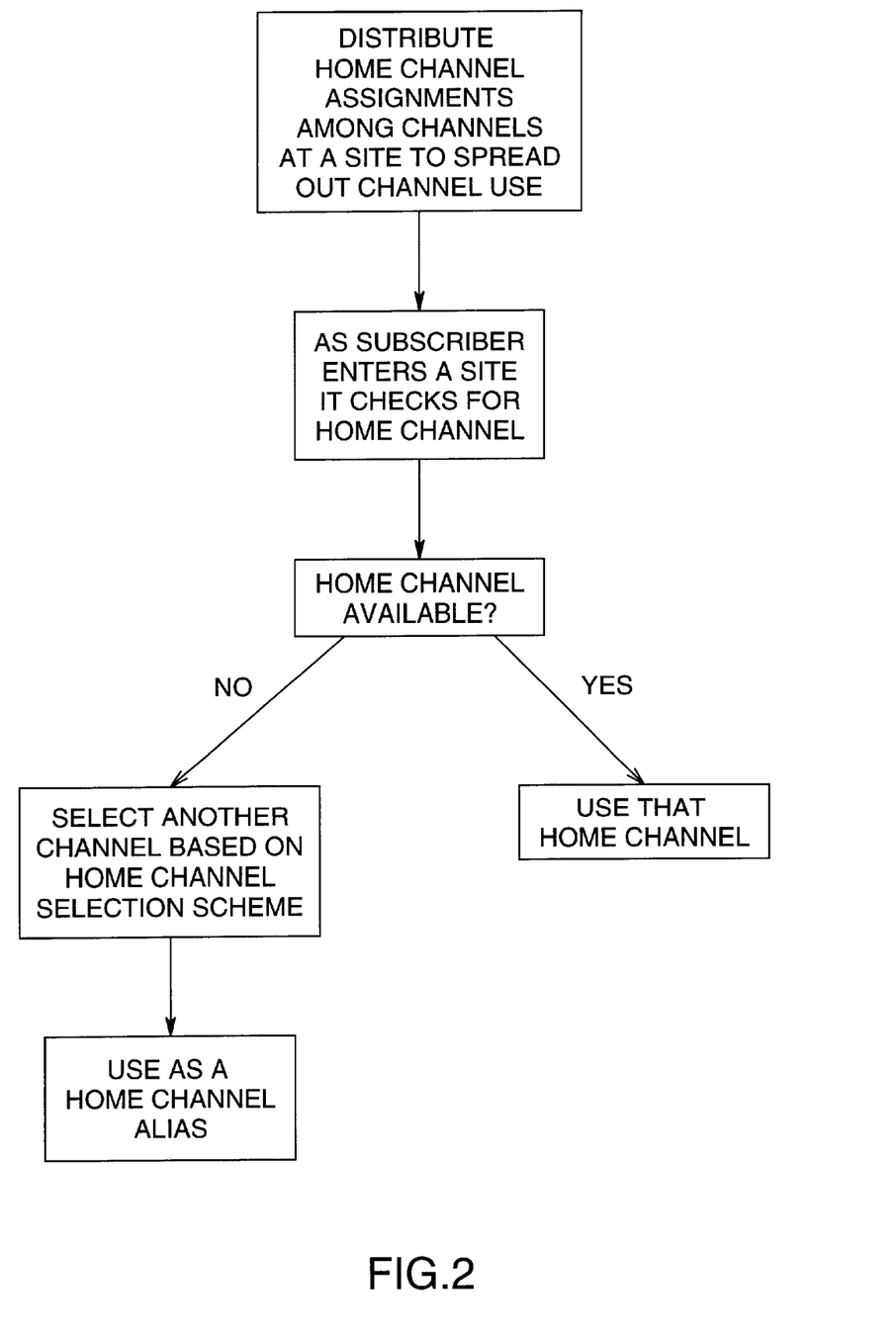
FIG. 2 is flow diagram for a home channel assignment system according to one embodiment of the present system.

In one embodiment of the present system, home channel assignments are distributed over all home channels or at least a majority of them at a locality. The repeaters in the system transmit a code which identifies free channels, which are channels available for communications. The channel where subscriber units reside, the number of channels that the total subscriber population is distributed over, and the backup channel capabilities are addressed differently. These issues impact access time, call handling, and collision probability. FIG. 2 shows a flow diagram of one embodiment of the channel distribution system.

Subscriber Unit Distribution

The total subscriber population is distributed over several 'home' channels. If the units are spread over multiple 'home' channels then the collision probability is reduced. This is due to the increased probability of different channels outputting different 'free' channels. This requires that the subscribers strive to monitor or reside on their given 'home' channel.

The subscriber unit and system have the ability to use an alias home channel when the specific channel is not defined and used at a given locality. This provides uniform home and talk group assignment over a total system with multiple locality coverage, and eases the burden of home and talk group usage for a system administrator.

Alias Home Channel

The alias home channel function allows subscriber units that are programmed for a given home channel a method to select another home channel or alias home channel for sites where the programmed home channel is not available. In one embodiment, the next lowest defined channel on a locality (set of repeaters) becomes the alias home channel and is monitored for its home channel traffic. This allows spreading of the subscriber units across the multiple channels on a locality and not placing all the non-defined home subscriber units on a single channel, such as a status channel. This reduces collision probability on the system. In one embodiment, this function is accomplished by distributed home channel numbering and by the subscriber units going to the next lowest defined channel to monitor. Distributed channel numbering is the distributed assignment of home repeater numbers so that subscribers using intervening channels are distributed among the home channel assignments. For systems where each repeater supports a single channel the distribution of channels amounts to a distribution across actual repeaters.
For example:

| | | | | | | | | | | | | | | | | | | | |
|---|---|---|---|---|---|---|---|---|---|---|---|---|---|---|---|---|---|---|---|
| 5 channel system: | 1 | | | | 5 | | | | 9 | | | | 13 | | | | 17 | | |
| 10 channel system: | 1 | | 3 | | 5 | | 7 | | 9 | | 11 | | 13 | | 15 | | 17 | | 19 |
| 15 channel system: | 1 | 2 | 3 | | 5 | 6 | 7 | | 9 | 10 | 11 | | 13 | 14 | 15 | | 17 | 18 | 19 |
| 20 channel system: | 1 | 2 | 3 | 4 | 5 | 6 | 7 | 8 | 9 | 10 | 11 | 12 | 13 | 14 | 15 | 16 | 17 | 18 | 19 | 20 |

The numbering of home repeaters allows a repeater that is acting as an alias to carry an equal load of the aliased channels. In the 5 channel system repeater 1 will act as the home for 2, 3, and 4; repeater 5 will act as the home for 6, 7, and 8, and so on.

For example, a subscriber unit programmed for home 12 on a 5 channel locality (numbered per the above chart) knows there is no channel 12 defined for the locality and will look for next lowest defined channel, number 9. When the subscriber unit roams into the 5 channel locality the unit will move to channel 9 to monitor for activity. In this example, repeater 9 is programmed such that if repeater 10, 11, and 12 are not active for the locality, then repeater 9 is the "alias" for repeaters 10, 11, and 12. When repeater 9 sees activity on the inter-repeater communications that another repeater is active with units from homes 10, 11, and/or 12, repeater 9 will act like the home for those repeaters and output the trunked traffic accordingly. Repeater 9 is reprogrammed for the proper aliasing if repeater numbering is changed.

Other aliasing techniques may be employed without departing from the scope and spirit of the invention. For example, instead of going to the next lowest available channel, the aliased home channel could be the next highest available channel.

Call Grouping

In one embodiment of the present system, the repeaters are programmed to conduct communications on a single channel for a single talk group to avoid talk group splitting. Talk group splitting occurs when two or more subscriber units of the same talk group attempt to access the system at approximately the same time on different channels. Both units may successfully handshake and, unless the repeater system assists, alternating collections will be made causing some units to go to one channel and other units to go to the other channel or, units may switch between the two channels.

A subscriber unit that is attempting to access a channel and receives a repeater response with the same home and talk group code but the channel in use is a different channel (or different repeater in cases where each repeater supports a single channel) should stop the channel acquisition and go to the channel (or repeater) in use and begin the receive process.

Since the subscriber unit operates in the manner stated in the above paragraph the repeater must operate to accommodate the above action. Again, in the case where each repeater supports a single channel, a change in the channel is related to a change in the actual repeater used to conduct communications. This operation is shown in FIG. 3 for one embodiment of the present system.

Figure 3:
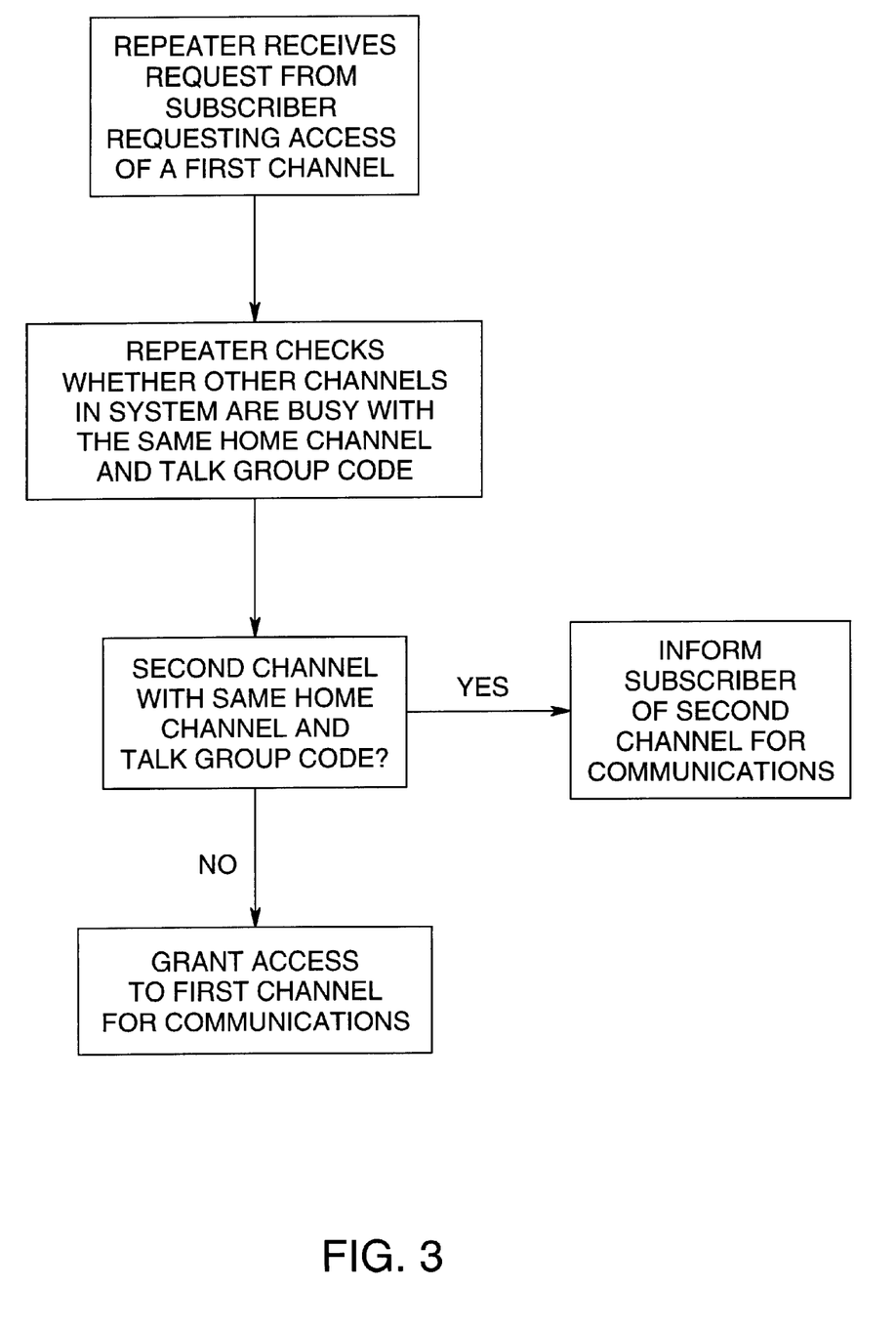
FIG. 3 is a flow diagram for a call grouping system, according to one embodiment of the present system.

As shown in FIG. 3, when a repeater receives an initial group call transmission from a subscriber unit, the repeater shall look to see if any other channel is busy with that specific home and talk group. If there are none then the present repeater shall grant access by returning the same home and talk group codes with the channel in use being that of the present repeater. If another channel is busy with that specific home and talk group, then the subscriber is directed to that channel to conduct communications.

Figure 4:
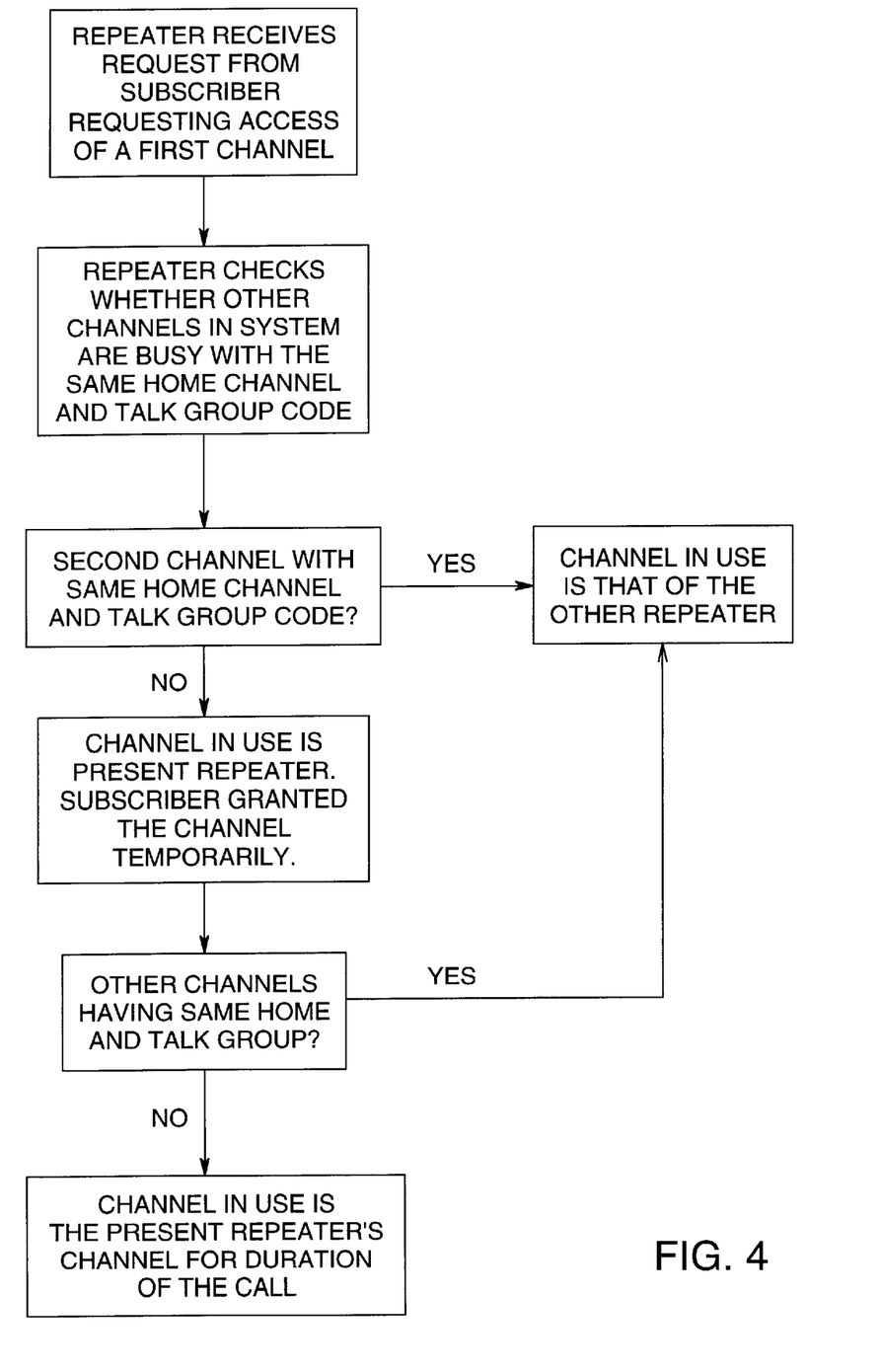
FIG. 4 is a flow diagram for a call grouping system, according to one embodiment of the present system.

FIG. 4 shows one embodiment in which a dual testing format is performed to collect subscribers to a single channel. In this embodiment, a first check of available channels is performed after the subscriber requests a channel. If a second channel is found which uses the same home and talk group, then the subscriber is directed to the second channel for communications. However, if no other channels are found to be communicating using the same home and talk group, then the present channel is granted temporarily for use. A second test is performed after the temporary grant of the present channel to determine if another channel is conducting communications using the same home and talk group information. Once the repeater temporarily grants the subscriber the channel the repeater communicates with the other repeaters. When the repeater attempts the initial inter-repeater communication, transitions from idle to busy with its local traffic at its transmission period, the repeater looks to see if the specific home and talk group is active on another channel. If no other channel using the same home and talk group information is found, then the present channel is fully granted for the duration of the call. Otherwise, if there was another channel active with the specific home and talk group at the initial inter-repeater communication then the present repeater shall change the channel in use that is being transmitted to the other active channel/repeater. The present repeater will operate as if the specific home and talk group is trunked traffic for the duration of the transmission from the subscriber unit. The second test accounts for the asynchronous nature of channel requests in a trunked radio system.

System Operation

Home channel distribution and aliasing and call grouping may be performed by any protocol which communicates home channel, talk group, channel in use and free channel information. For example, in LTR systems, which are explained in U.S. Pat. No. 5,159,701, and the other documents incorporated by reference above, home channel information is provided by the LTR HOME code; channel in use information is provided by the LTR GO TO code; free channel information is provided using the LTR FREE code; and talk group information is provided using the LTR ID code.

In LTRNET(tm) systems, which relate to the NP system discussed in U.S. Provisional Patent Application Ser. No. 60/047,843, entitled IMPROVED REPEATER COMMUNICATIONS PROTOCOL, and U.S. patent application Ser. No. 09/058,678, filed Apr. 10, 1998, entitled TRUNKED RADIO REPEATER COMMUNICATION SYSTEM, which were incorporated by reference in their entirety, above, home channel information is provided by the NP HOME code; channel in use information is provided by the NP ChiU code; free channel information is provided using the NP FREE code; and talk group information is provided using the NP GROUP code.

In MULTINET(tm) systems, which are also discussed in the incorporated documents, including U.S. Pat. No. 5,159,701, home channel information is provided by the MULTINET(tm) HOME code; channel in use information is provided by the MULTINET(tm) GO TO code; free channel information is provided using the MULTINET(tm) FREE code; and talk group information is provided using the MULTINET(tm) GROUP code.

Those skilled in the art will readily recognize that other protocols may be used without departing from the scope of the present invention.

Home channel distribution and aliasing and call grouping may be used separately or in combination by a trunked repeater system. In a system which uses home channel distribution and aliasing and call grouping in combination, the repeaters are programmed to track and monitor the aliased home channels to perform call grouping Further information may be found in U.S. patent application Ser. No. 09/058,678, filed Apr. 10, 1998, entitled TRUNKED RADIO REPEATER COMMUNICATION SYSTEM, which was incorporated by reference in its entirety, above.

The foregoing description is intended to demonstrate embodiments of the present invention. One skilled in the art will readily recognize that systems having different names, codes and procedures are taught by the present teachings and do not depart from the scope of the present invention. The teachings herein are not to be taken in an exclusive, exhaustive, or limiting sense, but are provided to describe different modes of the present invention, and the scope of the present invention is given by the attached claims and their equivalents.

What is claimed is:

1. A method for channel assignment, comprising:
   distributing candidate home channel numbers across a range of available channel numbers;
   assigning a home channel to each subscriber;
   scanning for an open channel corresponding to the home channel assigned the particular subscriber;
   if the home channel is available, conducting communications on the home channel; and
   if the home channel is unavailable, seeking a next available home channel.

2. The method of claim 1, wherein the act of seeking comprises scanning for another available home channel at a channel below the home channel.

3. The method of claim 1, wherein the act of seeking comprises scanning for another available home channel at a channel above the home channel.

4. The method of claim 1, wherein communications between a subscriber and a repeater include communications of home channel information using a home code, open channel information using a free channel code, and channel in use information.

5. The method of claim 1, further comprising:
   upon receipt of a group call transmission from a subscriber on a first channel, checking for other channels conducting communications having an identical home channel and an identical talk group; and
   if a second channel is conducting communications having the identical home channel and the identical talk group, instructing the subscriber to use the second channel for communications.

6. The method of claim 5, further comprising if a second channel is conducting communications having a home channel alias associated with the identical home channel and the identical talk group, instructing the subscriber to use the second channel for communications.

7. The method of claim 5, further comprising if no other channel is found allowing the subscriber to conduct communications on the first channel.

8. The method of claim 5, wherein the first channel is temporarily granted for use by a subscriber if another channel is not found to be conducting communications having an identical home channel and an identical talk group, and a second test is performed to decide if the first channel is fully granted.

9. A method for channel assignment, comprising:
   distributing candidate home channel numbers across a range of available channel numbers;
   assigning a home channel to each subscriber;
   scanning for an open channel corresponding to the home channel assigned the particular subscriber;
   if the home channel is available, conducting communications on the home channel; and
   if the home channel is unavailable, seeking a next available home channel below the home channel;
   wherein communications between a subscriber and a repeater include communications of home channel information using a home code, open channel information using a free channel code, and channel in use information.

10. The method of claim 9, further comprising:

upon receipt of a group call transmission from a subscriber on a first channel, checking for other channels conducting communications having an identical home channel and an identical talk group; and if a second channel is conducting communications having the identical home channel and the identical talk group, instructing the subscriber to use the second channel for communications.

11. The method of claim 10, further comprising if a second channel is conducting communications having a home channel alias associated with the identical home channel and the identical talk group, instructing the subscriber to use the second channel for communications.

12. The method of claim 10, further comprising if no other channel is found allowing the subscriber to conduct communications on the first channel.

13. The method of claim 10, wherein the first channel is temporarily granted for use by a subscriber if another channel is not found to be conducting communications having an identical home channel and an identical talk group, and a second test is performed to decide if the first channel is fully granted.

14. A trunked repeater system, comprising a plurality of repeaters and a plurality of subscribers incorporating the method of claim 9.

15. A trunked repeater system, comprising a plurality of repeaters and a plurality of subscribers incorporating the method of claim 12.

16. A method for channel assignment, comprising:

upon receipt of a group call transmission from a subscriber on a first channel, checking for other channels conducting communications having an identical home channel and an identical talk group; and if a second channel is conducting communications having the identical home channel and the identical talk group, instructing the subscriber to use the second channel for communications.

17. The method of claim 16, further comprising if a second channel is conducting communications having a home channel alias associated with the identical home channel and the identical talk group, instructing the subscriber to use the second channel for communications.

18. The method of claim 16, further comprising if no other channel is found allowing the subscriber to conduct communications on the first channel.

19. The method of claim 16, wherein the first channel is temporarily granted for use by a subscriber if another channel is not found to be conducting communications having an identical home channel and an identical talk group, and a second test is performed to decide if the first channel is fully granted.

20. The method of claim 16, further comprising:

distributing candidate home channel numbers across a range of available channel numbers;

assigning a home channel to each subscriber;

scanning for an open channel corresponding to the home channel assigned the particular subscriber;

if the home channel is available, conducting communications on the home channel; and if the home channel is unavailable, seeking a next available home channel.

21. The method of claim 20, wherein the act of seeking comprises scanning for another available home channel at a channel below the home channel.

22. The method of claim 20, wherein the act of seeking comprises scanning for another available home channel at a channel above the home channel.

23. The method of claim 20, wherein communications between a subscriber and a repeater include communications of home channel information using a home code, open channel information using a free channel code, and channel in use information.

24. A trunked repeater system, comprising a plurality of repeaters and a plurality of subscribers incorporating the method of claim 16.

* * * * *

UNITED STATES PATENT AND TRADEMARK OFFICE
CERTIFICATE OF CORRECTION

PATENT NO. : 6,684,080 B1
DATED : January 27, 2004
INVENTOR(S) : Barnes et al.

It is certified that error appears in the above-identified patent and that said Letters Patent is hereby corrected as shown below:

<u>Title page,</u>
Item [74], *Attorney, Agent or Firm*, delete "Woesner" and insert -- Woessner --, therefor.

<u>Column 2,</u>
Line 32, after "LTR®" insert -- (Logic Trunked Radio) --.

<u>Column 4,</u>
Line 17, after "1996," insert -- now issued as U.S. Patent No. 5,815,799, on September 29, 1998, --.

Signed and Sealed this

Eighth Day of June, 2004

JON W. DUDAS
*Acting Director of the United States Patent and Trademark Office*